US011469899B2

(12) United States Patent
De Los Santos Vilchez et al.

(10) Patent No.: US 11,469,899 B2
(45) Date of Patent: Oct. 11, 2022

(54) SYSTEM AND A METHOD FOR USER AUTHENTICATION AND/OR AUTHORIZATION

(71) Applicant: TELEFONICA DIGITAL ESPANA, S.L.U., Madrid (ES)

(72) Inventors: Sergio De Los Santos Vilchez, Madrid (ES); Aruna Prem Bianzino, Madrid (ES); Jose Torres Velasco, Madrid (ES); Enrique Rando Carrion, Madrid (ES)

(73) Assignee: TELEFONICA CYBERSECURITY TECH S.L., Madrid (ES)

( * ) Notice: Subject to any disclaimer, the term of this patent is extended or adjusted under 35 U.S.C. 154(b) by 41 days.

(21) Appl. No.: 17/020,244

(22) Filed: Sep. 14, 2020

(65) Prior Publication Data
US 2021/0083877 A1    Mar. 18, 2021

(30) Foreign Application Priority Data

Sep. 16, 2019 (EP) .................................. 19382802

(51) Int. Cl.
*H04L 9/32*      (2006.01)
*H04W 12/72*    (2021.01)

(52) U.S. Cl.
CPC .......... *H04L 9/3234* (2013.01); *H04L 9/3226* (2013.01); *H04W 12/72* (2021.01)

(58) Field of Classification Search
CPC ....... H04L 9/3234; H04L 9/3226; H04L 9/32; H04W 12/72; G06F 21/35; G06F 21/34
See application file for complete search history.

(56) References Cited

U.S. PATENT DOCUMENTS

| | | | | |
|---|---|---|---|---|
| 2012/0306813 | A1* | 12/2012 | Foerster | G06F 3/04162 345/174 |
| 2017/0039567 | A1* | 2/2017 | Stern | G06Q 20/3276 |
| 2019/0066093 | A1* | 2/2019 | Akhtar | G06Q 20/341 |
| 2019/0278457 | A1* | 9/2019 | Ha | G06K 19/0672 |
| 2020/0257408 | A1* | 8/2020 | Yoshida | G06F 3/0443 |

FOREIGN PATENT DOCUMENTS

| | | |
|---|---|---|
| EP | 2722739 A1 | 4/2014 |
| EP | 3564837 A1 | 11/2019 |
| WO | 2017/024011 A1 | 2/2017 |

OTHER PUBLICATIONS

European Search Report of EP19382802.7 dated Feb. 5, 2020.

* cited by examiner

*Primary Examiner* — Nelson S. Giddins
(74) *Attorney, Agent, or Firm* — Sughrue Mion, PLLC (57) ABSTRACT

A system and a method for user authentication and/or authorization, including a passive card to encode a first portion of an authentication or authorization code for a user via capacitive points, and a portable computing device with a capacitive screen to encode a second portion of the code. Each capacitive point is connected to an electronic circuit, being activable by physical contact of the user or with an electrical ground. Once the user has requested access to a specific service or operation, and when at least some of the passive points are activated and the passive card is in contact with the capacitive screen, the device reads the capacitive points, decoding the first portion of the code, and cryptographically signs the decoded portion using the second portion, providing the code, which is used as cryptographic key to grant access to the service or operation.

12 Claims, 4 Drawing Sheets

SYSTEM AND A METHOD FOR USER AUTHENTICATION AND/OR AUTHORIZATION

TECHNICAL FIELD

The present invention generally relates to user authentication and/or authorization systems and methods. In particular, present invention proposes a passive card with capacitive points, and a portable computing device to be used in authentication and/or authorization solutions. The capacitive points are connected to an electronic circuit such that they are activable by physical contact of a user or with an electrical ground.

BACKGROUND OF THE INVENTION

Users constantly access services and resources from mobile and portable computing devices. The authentication of the accessing users is of paramount importance to protect the access to services themselves, resources and sensitive data, and limit it to only the authorized users.

The need of identifying users consuming different types of services is closely related to the prevention of identity theft but privacy security must also be considered. It is therefore of extreme interest to establish whether users are who they claim to be, but it is as much important to keep confidentiality about the exchanged information in such process.

The user identification process is usually based on some credentials, whose ownership and verification guarantee to check the user identity. The used credentials are usually issued by a trusted authority and are theoretically impossible (or at least extremely difficult) to falsify, allowing to determine whether the users correspond to who they claim to be or not.

The user identification process is built on top of the so-called validation or authentication mechanisms. Such mechanisms are designed to validate some information that the user brings to access the requested (digital) services. The carried information (which the user provides to the authentication mechanism to be validated) usually falls into one of the following categories: something that the user knows (e.g., a secret keyword), something that the user owns (e.g., an physical object also called physical token, like a smart-card, a SIM card, an NFC tag . . . ), something that the owner is (e.g., any measurable physical feature, univocally identifying the user, like fingerprints or iris identification), something that the user does (e.g., motion patterns, signature, etc.), or somewhere that the user is (e.g., being in a specific location). This information is what is known as identifier or digital credential. Sometimes a combination of information belonging to different of these categories is used, to improve security.

The effectiveness of any authentication solution cannot be measured only in terms of security—as many of them are equivalent on that aspect—but rather accounting also for usability, ease of implementation, and cost and energy consumption. Only by keeping into account all these aspects at the same time it is possible to obtain a wide adoption of the authentication solution by the users.

One of the main flaws of the current authentication solutions is represented by the fact that user credentials (password, token, or event fingerprint, etc.) are subject to copy, shoulder sniffing, or theft by malicious external observers, which can then access the objective service/asset by faking their identity to the one of an authorized user.

Tam Vu et al., "Capacitive Touch Communication: A Technique to Input Data through Devices' Touchscreen", describes a method to identify and authenticate users on touch screen devices, based on wearable artifacts actively generating an input, which will be detected by the capacitive screen and decoded as a binary sequence. This solution uses an active device—ring, watch, etc.—as a low power continuous transmitter, to provide users with (continuous) authentication. On the contrary, present invention uses a passive device (card) to authenticate the end user.

Mohamed Azard Rilvan et al., "User authentication and identification on smartphones by incorporating capacitive touchscreen", leverages on a snapshot taken by a capacitive screen, of four fingers or an ear or a thumb and uses it as key for a one-time authentication to access specific services or resources in the device itself. This solution is based on measurements of human body features, not 100% reliable by nature (and by claim of the authors). Furthermore, this solution does not allow multi-sector division of the readable area to provide multi-service authentication and/or random request of a specific sector for the authentication, and/or coding of other data and metadata.

Sun, Jingchao, et al. "Touchin: Sightless two-factor authentication on multi-touch mobile devices" describes a solution to identify users on mobile devices on the basis of a gesture executed on the touch interface of the mobile device itself. The gesture detection is independent from the screen zone on which it is executed, preventing smudge attacks and making shoulder sniffing harder. This solution relies on an authentication factor (i.e., the touch gesture) which cannot naturally translate into an encryption key, nor be divided into different sectors/areas to implement neither multi-functional authentication nor an authentication based on random sector selection. Furthermore, the described solution presents a non-null set of visible elements, i.e., the signature, which is subject to shoulder sniffing by nature.

US96520066 describes a method for fingerprint reading all over a capacitive screen, also possible while performing other actions (touch, etc.). The fingerprint reading is then used as authentication factor for the user, eventually on a continuous basis. The solution requires specific hardware in the end device (i.e., a finger biometric sensing layer). Furthermore, it is based on measurements of human body features. As such, the solution is not 100% reliable by nature and does not allow multi-sector division of the readable area to provide multi-service authentication and/or random request of a specific sector for the authentication.

EP-2527955-A1 is based on the detection of specific objects by mobile devices, by optical or capacitive sensing, in order to activate predetermined status of the device (e.g. standby). It may eventually be used also for authentication purposes. The object identification proposed in this patent application aims at associating a common object to a desired state (e.g., charger to standby) but not at differentiating multiple instances of the same object, nor at encoding a specific unique code into the object with authentication and/or encryption purposes.

WO-2017143193-A1 describes a method to identify and authenticate users on touch screen devices, based on wearable artifacts actively generating an input, which will be detected by the capacitive screen and decoded as a binary sequence. This solution refers to the one described also in the paper Tam Vu et al. "Capacitive Touch Communication: A Technique to Input Data through Devices' Touchscreen". The method uses an active device—ring, watch, etc.—as a low power continuous transmitter, to provide users with (continuous) authentication. On the contrary, present invention uses a passive device (card) to authenticate the end user.

US-2016004407-A1 relates to a system for user authentication based on a card with a multitouch surface touching. A multitouch capacitive surface that identifies the object and authenticates the user on the basis of a motion executed by the user using the card is also disclosed. The system aims at the authentication of a set of users carrying different instances of the same authentication card. This solution may include a motion that the user must execute with the card on the capacitive surface, introducing limiting constraints on the screen size. In fact, it is designed for the authentication in fix capacitive screens rather than in mobile devices with a limited capacitive surface, even if a variant solution is described also in the case of use of the capacitive surface of a mobile phone. Finally, no possibility is given to implement a multi-service authentication, nor a multi-sector authentication selecting a random sector/area in different authentication instances. Furthermore, no possibility to use the contact pattern as a part of an encryption code is included in this patent application.

KR-2016036133-A discloses a system for user authentication and operation authorization based on a rubber-stamp that is applied on a capacitive screen of a mobile device and presents a specific capacitive pattern, allowing the user to authenticate for a service and/or to authorize specific operations. This solution does not decode the sequence of capacitive points into a code, as such, nor includes the device into the authentication and authorization process. In present invention, furthermore, the code decoded from the series of capacitive points is concatenated with a code in the device to form a unique key, which is used for authentication and authorization purposes, but may also be used to encrypt the communication with the service server. Finally, this solution does not include multiple capacitive zones to be used for randomization purposes or to authenticate and authorize different services and operations.

WO-2017024011-A1 describes an authentication system based on a card carrying both visible and machine-readable information. The machine-readable information may include patterns realized using capacitive ink (visible and copiable, and not allowing to freely customize the time constant of the different capacitive points). The information carried by the card is used to authenticate a user into a remote system. On the contrary, present invention includes information about the user account into the card itself, but, differently from this PCT patent application, the information is encrypted using the shape, position, size and time constant of the capacitive points of the card, while in the described solution it is visible on the card (copiable), or encrypted on a magnetic stripe (i.e., requiring specific hardware to be read). Furthermore, present invention's solution includes the mobile device as active part in the authentication process, including itself a portion of the authentication key and making theft much more difficult and evident for the end user.

EP-2722739-A1 describes a system including a card to be used by the user to access a service. The card is (partially) transparent so that, once placed over the capacitive screen of a mobile device, the user can see indications for some actions to be performed over/with the card (like touching specific points of the card, or swiping the card, etc.). This solution represents a further element in guaranteeing the secure access to a service when using a specific card, but it implies (i) visual signs on the card making it susceptible to shoulder sniffing or copying, (ii) a clunkier authentication process for the final user, including different gestures to be performed and observation over the device output including an interactive and more time consuming process, and (iii) a limitation on the number of capacitive points (fingers) that can be excited for a single authentication process, as well as a limitation on the information they can encode (i.e., there is no direct and exact control on the size, shape and time constant of the point, being them excited by fingers).

WO-2009009788-A1 discloses an authentication system based on a generic token including biometric information of the user authorized to operate with it. The token is used together with the biometric info to allow the user to access specific data or locations. This solution includes biometric data of the user, which is not the case of present invention. Furthermore, this solution only allows a specific user to operate the authentication, while in present invention the operation may be performed by any user, as far as they have both the token (card) and the specific mobile device. Present invention allows also the authentication for service usage which does not look to be the case in the scope of this PCT patent application, which is designed to authenticate users to only access data and locations. Furthermore, in present invention, the data encrypted on the card may be partially open for decryption, to include metadata about the authentication system or the card producer, while in the solution described in this PCT patent application the data encrypted in the token is only accessible through the unique biometric identifier of the user. Finally, in present invention, the mobile device is an active part of the authentication process, including a part of the key and being paired to the card to prevent theft, while in the solution described in WO-2009009788-A1 this is not the case.

Known solutions still lack of high reliability, availability and ease of use. More solutions are therefore needed for user authentication and/or authorization.

DESCRIPTION OF THE INVENTION

To that end, present invention provides, according to a first aspect, a system for user authentication and/or authorization, comprising a passive card to encode a first portion of an authentication or authorization code for a user via a set of capacitive points; and a portable computing device (e.g. a mobile phone, a laptop, a tablet, etc.) with a capacitive screen and configured to encode a second portion of said authentication or authorization code. The capacitive points are preferably located inside the passive card.

In the proposed system, the set of capacitive points in the passive card are connected to an electronic circuit, so that they are activable by physical contact of the user (e.g. by a finger) or with an electrical ground. Hence, once the user has requested access to a specific service or to a specific operation, and when at least some of the capacitive points have been activated (for example, when the user has physically touched a user connection point or a contact with an electrical ground has been selected) and the passive card is in contact with the capacitive screen, the portable computing device can read the capacitive points, decoding the first portion of the authentication or authorization code, and can cryptographically sign the decoded first portion using said encoded second portion of the authentication and authorization code, providing the authentication or authorization code, which is used as cryptographic key to grant access to said specific service or specific operation to the user.

Moreover, the capacitive points may be activated by contact with an electrical ground in the case in which the card is not carried by the user, but embedded into a machine/device. This may allow the user, carrying the portable computing device uniquely identified, to certify that he has been in a specific location at a specific time, like, for instance, a technician reviewing the status of said machine/device, or a guard reviewing the security of an area. It should be noted that in this case the capacitive points have to be also close to the capacitive screen in order the portable computing device being able to read them.

Thus, the proposed system represents a highly reliable authorization and/or authentication solution, while being usable, easy to implement, simple, cheap and with minimum energy consumption. Furthermore, as different characteristics are used to encode information, some of them can be used to encode authentication credentials, while others can be used to encode public information (e.g., user identification, identification of the card producer or of the authentication system, etc.). Finally, multiple authentication credentials may be encoded in the same card and they can be activated one at a time in order to access to different services with the same authentication system, and including something that the user knows (i.e., the correct credential to activate), to the authentication system, increasing its robustness.

Particularly, the set of capacitive points are invisible to human inspection.

In an embodiment, the capacitive point includes an electric resistance by which it connects to the electronic circuit. The electric resistances of the capacitive points can be either equal or different.

According to the proposed invention, the first portion of the authentication or authorization code depends on the shape, size, position and/or time constant of the set of capacitive points in the passive card.

According to the proposed system, some of the capacitive points may include information about the user or metadata about the card distributor. The information or metadata is preferably encoded with an encoding system different to the encoding system used to encode the first portion of the authentication or authorization code.

In an embodiment, the set of capacitive points at least includes two capacitive points located in predefined parts of the passive card. Alternatively, the set of capacitive points form a unique figure.

In an embodiment, the passive card is divided into different logical areas/sectors, each area/sector comprising a set of capacitive points encoding a different first portion of the authentication or authorization code such that each different first portion can be used to authenticate a different service or to authorize a different operation.

In yet another embodiment, the set of capacitive points are arranged divided in sets, wherein each set is connected to a different user connection point or to a different electrical ground, being it possible to remotely switch one of the ground connections at a time. Each set can be used, for example, for a different service or operation (different banks, public administration, etc.).

In yet another embodiment, the second portion of the authentication or authorization code is stored in a subscriber identification module (SIM) of the portable computing device. Alternatively, in another embodiment, the second portion is stored in a memory of the portable computing device with restricted access.

Embodiments of the present invention also provide according to a second aspect a user authentication and/or authorization method. The method comprises encoding a first portion of an authentication or authorization code for a user through a set of capacitive points included, particularly, inside the passive card; encoding a second portion of said authentication or authorization code in a portable computing device having a capacitive screen; connecting the set of capacitive points in the passive card to an electronic circuit, so that being activable by physical contact of the user (or by the contact with an electrical ground); once the user has requested access to a specific service or to a specific operation and when at least some of the capacitive points have been activated (e.g. the user has physically touched a user connection point or a contact with an electrical ground has been selected) and the passive card is in contact with the capacitive screen reading, by the portable computing device, said capacitive points, decoding the first portion of the authentication or authorization code; and cryptographically signing, by the portable computing device, the decoded first portion using the stored second portion of the authentication or authorization code, providing the authentication or authorization code, which is used as cryptographic key for granting access to said specific service or specific operation to the user.

Hence, present invention:

Does not require specific hardware to work but relies on hardware available on any current portable computing device (i.e., a capacitive input area).

Does not require precision from the user in terms of executed gesture, making the process more user friendly.

Does guarantee a double factor of authentication, as the system is composed by two unique components, i.e., the passive card and the portable computing device, each one of which can only work in correspondence of the other corresponding one.

Does not require an active device, but only a passive card of common "credit card" size, easy to carry and cheap to produce. Furthermore, the system is robust to partial damaging of the card.

Is robust against attacks as the code is not visible in the card (shoulder sniffing, copying, distant photo) a physical contact is needed to read (and eventually copy the card)—unlike NFC—, the authentication key is partially stored in the passive card and partially stored in the computing device, making it ineffective to use the card on a different computing device (thievery), the key is encoded in a specific portion of the card, unknown to the attacker, and the authentication process may be based each time on a different code, unpredictable and randomly generated (Trojan viruses, hacker attacks, or phishing services). So, it is resilient to brute force attacks at least in 1/n of the times, being "n" the number of possible codes.

Is easy and quick to use, as the user just needs to place the card on the capacitive surface of the computing device, without requiring card centering or a specific card positioning.

May be used to authenticate for different services or to authorize different kind of operations, thanks to the multi-sector surface division.

May not only be used as a token for identification and authentication, but a specific portion of the capacitive points may be used to encode information about the user (as an OpenID), or metadata about the system and the card distributor, among other possibilities. This information will be encoded using a different—open—encoding system, to make its decoding available to any use.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which:

FIG. 4 is an example of different sets (S1 and S2) of capacitive points in a passive card (contact points on the contact surface which will touch the capacitive screen), and their connection to different user connection points on the touch surface.

DETAILED DESCRIPTION OF PREFERRED EMBODIMENTS

Figure 1:
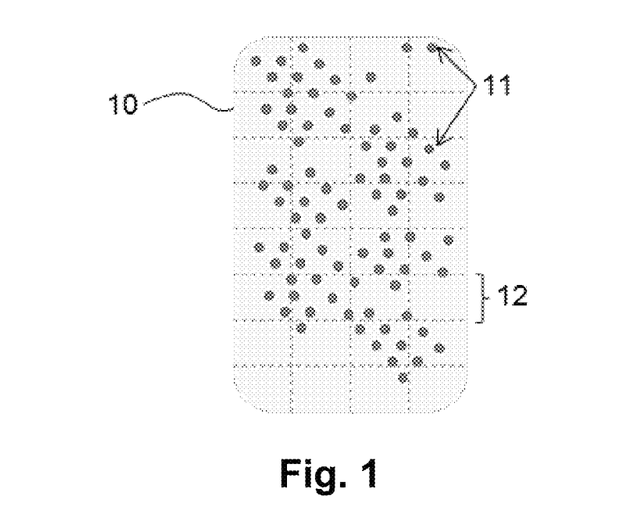
FIG. 1 illustrates an example of the capacitive points included in the passive card and a possible area/sector division.

The proposed solution leverages on the presence of a capacitive input area on portable computing devices 20 as a reader for a special passive card 10 including a set of capacitive points 11 (see FIG. 1). The capacitive points 11 simulate the pressure on the capacitive input area as seen by the capacitive screen, generating a specific and unique input. The capacitive points 11 are placed, particularly, inside the passive card 10.

The capacitive points 11 are easy and cheap to implement on a common plastic card (a passive device), while they are invisible to human inspection, making the solution robust against shoulder sniffing, distant photo or scanned, and the card surface keeps available for any printing (branding, advertisement, metadata, etc.). On the other hand, the card reading is executed by a capacitive surface which is currently present in any portable computing device 20 (e.g. Smartphone, tablet, laptop, etc. having a touch screen or touch pad), not requiring any additional or specific hardware, unlike other solutions based on NFC technology or fingerprint reading.

The size, shape, position and/or time constant of the capacitive points 11, or a combination of at least two of these characteristics is used to encode a unique sequence (or first portion of an authentication or authorization code). The number of possible sequences is high enough to guarantee uniqueness between different created cards. The unique sequence is then cryptographically signed using as a key another unique sequence (or second portion of the authentication or authorization code) stored in the portable computing device 20 and preferably obtained at the time of the installation of an specific software application that will be used to perform the passive card 10 reading, representing a unique pairing with the unique sequence (or first portion) encoded in the passive card 10. The sequence obtained from the concatenation represents the authentication or authorization code that can be used as a cryptographic key to access to the required service and/or authorize the required operation. The portion of the code stored in the portable computing device 20 may be located in the SIM card or in other memory portions with restricted access, as the security elements (SE) with what some smartphones have.

The presence of two different code portions (first portion and second portion or card code portion and device code portion as can be also termed), located into two different physical devices (i.e., the portable computing device 20 and the passive card 10) make the system robust against thievery, as the theft of one of the two elements alone does not allow any access/authorization, while the absence of the devices will easily be noticed, and the access devices may be remotely blocked by the user himself through a proper software procedure.

Figure 2:
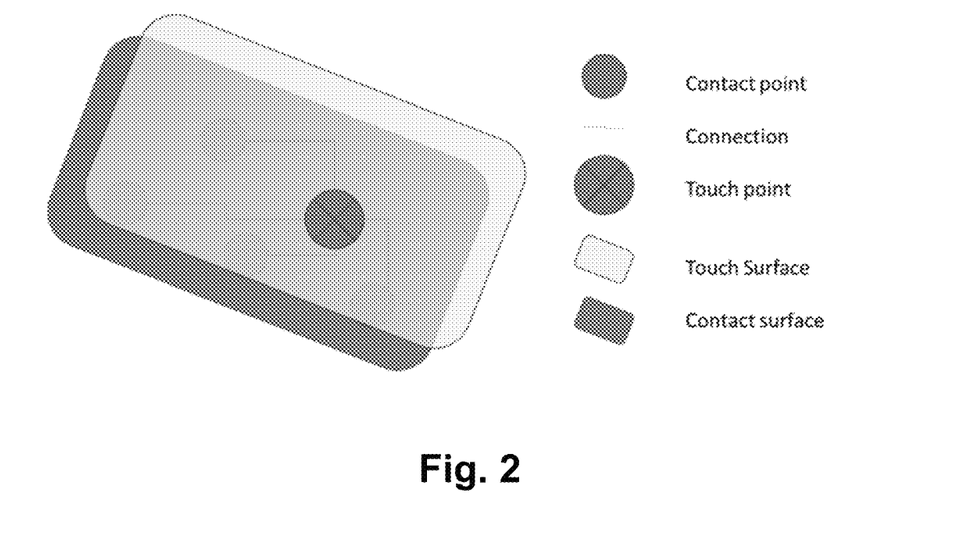
FIG. 2 is an example of capacitive points in a passive card (contact points on the contact surface which will touch the capacitive screen), and their connection to a user connection point on the touch surface.

In a particular embodiment, the capacitive points 11 in the passive card 10 have to be "activated" by a user physical contact. In practice, this means that an electronic circuit is put in contact with the user body (e.g., finger) with the capacitive points 11 in the passive card 10 (see FIG. 2 for an example). Alternatively, the capacitive points 11 can be "activated" via a connection with an electrical ground (see FIG. 4B for an example). At the same time, if at least one electric resistance is introduced in such electric circuit (see FIG. 3 for an example), a change will be induced in the time constant of the electric circuit itself, hence artificially changing the capacity detected in correspondence of the specific capacitive point 11 in the passive card 10. In particular, the time constant of the electric circuit ($\tau$) is equal to the product of the circuit resistance (R) and its Capacitance (C), resulting as $\tau=RC$. As such, increasing the electric resistance will result in a proportional increase of the time constant of the electric circuit, meaning an increase of the Capacity charge time and of the perceived capacity.

Figure 3:
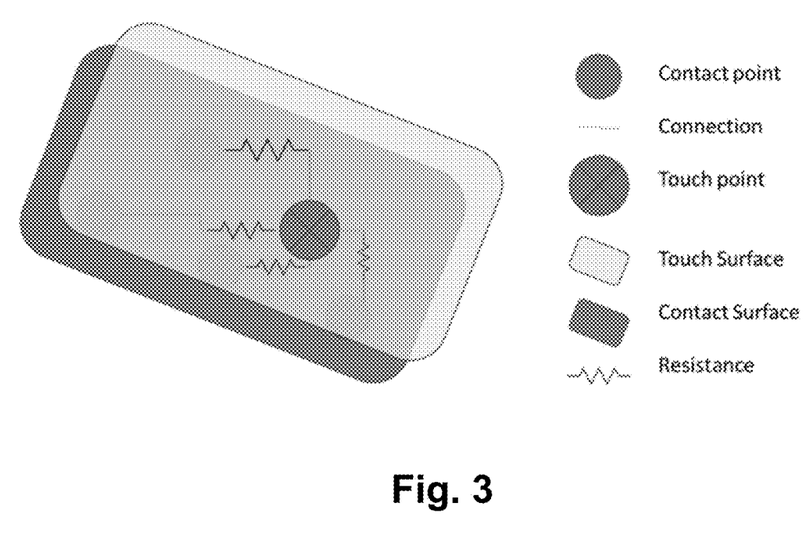
FIG. 3 illustrates an example of the connection of the electrical resistances added in the connection between the contact points and the connection point, resulting in different voltages, and hence different time constants.

This variation allows on the one side to avoid different user connection points being at the exact same voltage, avoiding interferences (which may result in ghosting—i.e., non-existing points detected on screen—and oscillation of values, and on the other side to encode a specific value in the time constant itself (e.g., establishing an a-priori ordering among the capacitive points 11 and encoding a value in the time constant of each one of them. The size of each variable varies accordingly to the discretization levels allowed by the technology).

The passive card 10 in an embodiment may include a pair (or more) of specific capacitive points 11 located in pre-established points of the card 10, for example positioned at two opposite corners, at three different corners as in the QR codes in case of including three capacitive points, etc., in order to make it easy to remove any measurement offset from the input reading and make it easier the card reading (i.e., not having to center it with respect to any mark, nor placing it in a specific position). Alternatively, the capacitive points 11 may form a unique figure in the passive card 10 and presenting the same benefits (not having to center the card with respect to reference points on the reading surface).

As can be seen in the embodiment of FIG. 1, the passive card 10 may be divided into different logical areas or sectors 12, each one comprising a set of capacitive points encoding a unique sequence (or different first portion of an authentication or authorization code).

The presence of different areas 12 in the passive card 10, corresponding to different encoded sequences, allow the following extra functionalities for the system:

Using different areas 12 to access to different services (e.g., bank #1, bank #2, other service, etc.) or to authorize different kind of operations.

Guaranteeing redundancy in case of partial damaging of the passive card 10.

Allowing to require the code corresponding to a random (sequence of) sector for different instances of the authentication to the same service or of the authorization of an operation. This is functionally equivalent to the current code cards released to bank customers for e-banking access. These results in unpredictable access coordinates, randomly designated, and hence prevents code thievery through false websites, Trojan viruses or hacker attacks, making the transaction secure. It allows not only to authenticate but to authorize, just in the same card.

Figure 4A:
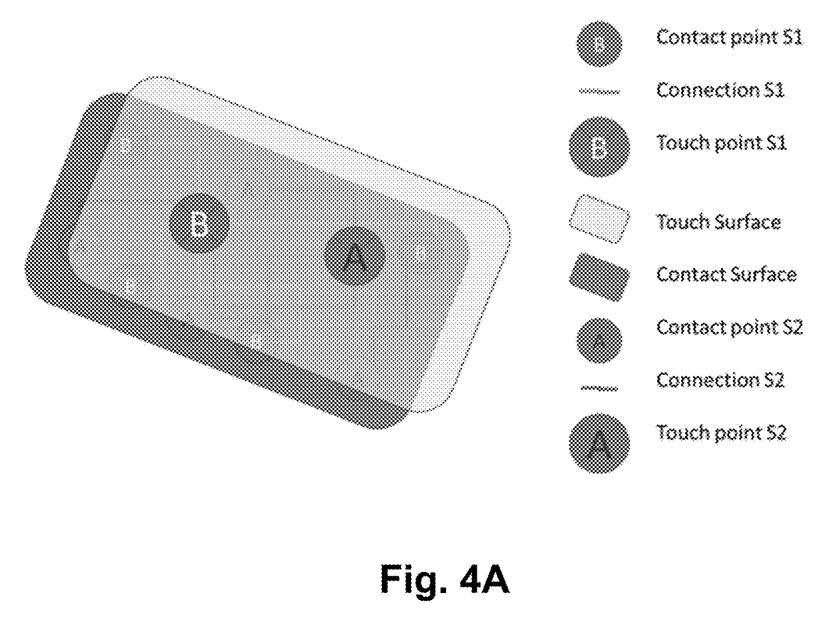
FIG. 4A illustrates an example in which the user will have to activate one of the capacitive points by touching the corresponding connection point, for instance by a finger.
Figure 4B:
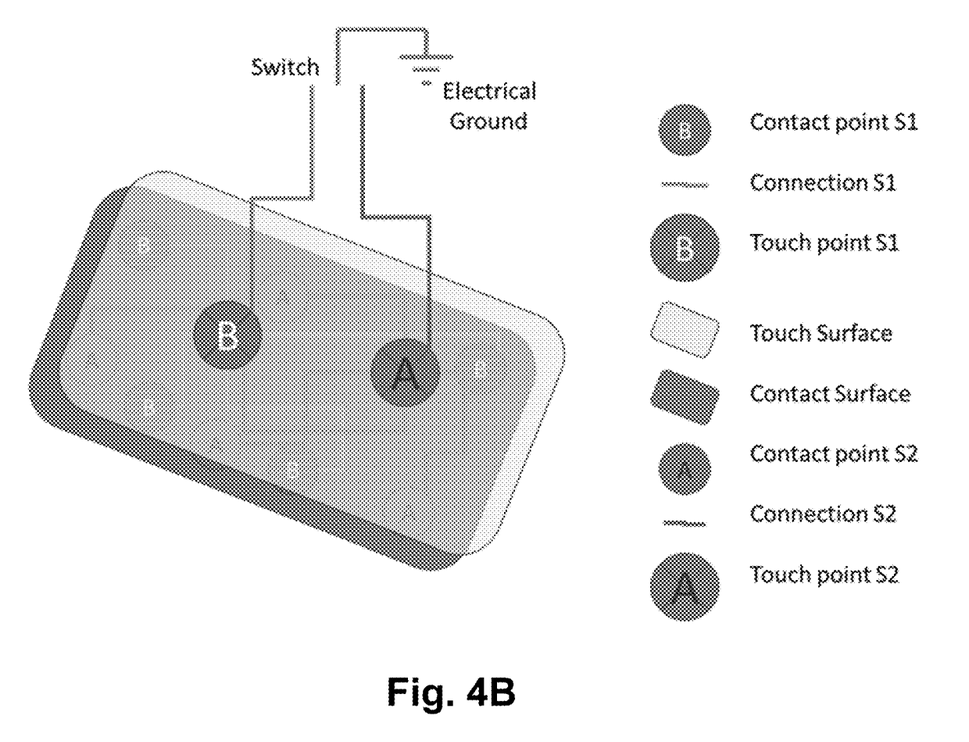
FIG. 4B illustrates an example in which the activation will be performed by contact with an electrical ground. Different electrical resistances may be added in the connection between each contact point and the correspondent connection point. Different contact points may belong to multiple point sets, as the touch points do not put all the different connections in touch.

As an alternative, or complementary, the capacitive points 11 may be divided in sets, each one connected to a different user connection point (see FIG. 4 for an example) or to a different connection to the electrical ground. The connection points do not put in contact directly the different contact points, in order to avoid interferences, as stated above, and also to allow different points to belong to multiple sets at the same time, without resulting in their activation to activate other undesired points.

The position of the passive card 10 with respect to the reading surface (e.g., horizontal/vertical, etc.) or a specific movement to be executed with the passive card 10 on the reading surface (e.g., rotation, swipe, etc.) may or may not be used as a further authentication element for the system, based on something that the user knows. For example, the system can be configured in such a way that a horizontal position of the passive card 10 on the reading surface is for accessing a given service whereas a swipe of the passive card 10 on the reading surface is for accessing another different given service.

Figure 5:
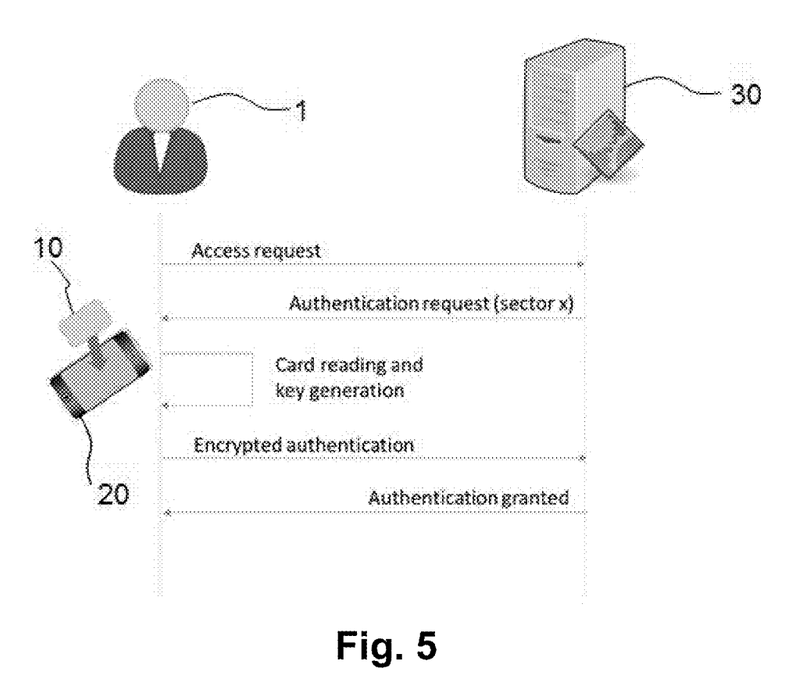
FIG. 5 is a flow diagram of an example authentication process.

With reference now to FIG. 5, therein it is illustrated an embodiment of a user authentication and/or authorization method using the proposed system. First, the passive card 10 is produced, encoding one or more specific codes (the first portion of the authentication or authorization code) through the sequence of capacitive points 11 included therein taking into account their size, shape, position and/or time constant, or combinations thereof. The passive card 10 is then given to the user 1 and a specific secret code (the second portion of the authentication or authorization code), associated with the passive card 10 as a unique pair, is stored in a trusted memory area in a portable computing device 20 (in this particular case a smartphone), preferably when the software application is installed to perform the passive card 10 reading. The different codes encoded in the passive card 10 may include private codes, but also public codes corresponding to metadata, or user identification.

The user 1 remotely connects to a server 30 requiring access to a specific service (e.g., e-banking, access to restricted information, etc.) or to authorize a specific operation (e.g., money transfer, publication of content, etc.). This access may be executed either on the portable computing device 20 or on any other computing device, including fix devices such as a PC.

The server 30 requires a specific user authentication to proceed with the required operation. The server 30 may include in this request the identification of a specific card area 12, or sequence of card areas, depending on the implementation.

If the user 1 is accessing the service from a computing device different to the portable computing device 20, the computing device employed connects to the portable computing device 20 using a secure connection and requires it to proceed with the authorization procedure. Otherwise, the portable computing device 20 directly proceeds with the authentication procedure. The user 1 locates the passive card 10 over the capacitive surface of the portable computing device 20, eventually in a specific position or with a specific movement, depending on the implementation, and physically touches a user connection point. The card input (sequence of capacitive points on its surface) is read by the portable computing device 20. The whole surface or a specific (sequence of) area(s) is decoded by the software application installed in the portable computing device 20. The resulting code is then cryptographically signed using as a key the unique code (second portion of the authentication or authorization code) stored in the portable computing device 20 to obtain a cryptographic key to be used by the portable computing device 20 to confirm the authentication to the server 30.

Finally, on the basis of the received communication, the server 30 authenticates the user 1/authorizes the operation, or not.

In the case of lost/thievery of one of the two components 10, 20 of the described system, the user 1 may require to the distributor, behind a specifically required authentication:

The (temporal) block of the operations executed with its user (e.g., loss of both elements).

The cancellation of the previously owned passive card 10 and the re-pairing of his/her portable computing device 20 with a new passive card 10, which will be provided through a secure channel (e.g., loss of the passive card 10).

The cancellation of the previously owned code for the portable computing device 20 and the re-pairing of his/her passive card 10 with a new portable computing device 20 (e.g., loss of the portable computing device 20).

In an embodiment, as a further feature, a specific portion of the capacitive points 11 may be used to encode some other kind of information, including metadata about the distributor or the system itself, or some open information about the user 1, serving as an OpenID or as a further level of validation. This information would be encoded using a different encoding system, as this may be available for open decoding.

The methods and systems discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for user authentication and/or authorization, comprising:
   a passive card configured to encode a first portion of an authentication or authorization code for a user via a set of capacitive points; and
   a portable computing device with a capacitive screen and configured to encode a second portion of said authentication or authorization code,
   wherein the set of capacitive points are connected to an electronic circuit to be activable by physical contact of the user or with an electrical ground, and
   wherein the portable computing device is further configured to, based on the user requesting access to a specific service or to a specific operation, and based on at least some of the capacitive points being activated and the passive card being in contact with the capacitive screen:
     read the set of capacitive points, decoding the first portion of the authentication or authorization code; and
     cryptographically sign the decoded first portion using said encoded second portion of the authentication and authorization code, providing the authentication or authorization code, which is used as cryptographic key to grant access to said specific service or specific operation to the user,
   wherein the first portion of the authentication or authorization code is encoded based at least on a shape and/or a size of the set of capacitive points in the passive card, and
   wherein the first portion of the authentication or authorization code is encoded further based on a time constant of the set of capacitive points.

2. The system of claim 1, wherein each capacitive point includes at least one electric resistance by which it connects to said electronic circuit.

3. The system of claim 2, wherein electric resistances of the capacitive points are equal.

4. The system of claim 2, wherein electric resistances of the capacitive points are different.

5. The system of claim 1, wherein at least two of the set of capacitive points are located in predefined parts of the passive card or wherein the set of capacitive points form a unique figure.

6. The system of claim 1, wherein the set of capacitive points are arranged divided in sets, wherein each set is connected to a different user connection point.

7. The system of claim 1, wherein the passive card is divided into different logical areas, each one comprising a set of capacitive points encoding a different first portion, each different first portion being to authenticate a different service or to authorize a different operation.

8. The system of claim 1, wherein the portable computing device is a mobile phone, a laptop or a tablet and wherein the second portion of the authentication or authorization code is encoded in a subscriber identification module, SIM, of the portable computing device or in a memory thereof with restricted access.

9. The system of claim 1, wherein some of the capacitive points of the set of capacitive points include information about the user or metadata about a card distributor, the information or the metadata being encoded with an encoding system different to the encoding system used to encode the first portion of the authentication or authorization code.

10. A user authentication and/or authorization method, comprising:
    encoding a first portion of an authentication or authorization code for a user through a set of capacitive points included in a passive card; and
    encoding a second portion of said authentication or authorization code in a portable computing device having a capacitive screen;
    wherein the method further comprises:
    connecting the set of capacitive points to an electronic circuit, to be activable by physical contact of the user or with an electrical ground;
    based on the user requesting access to a specific service or to a specific operation and based on at least some of the capacitive points being activated and the passive card being in contact with the capacitive screen, performing the following operations:
      reading, by the portable computing device, the capacitive points, decoding the first portion of the authentication or authorization code; and
      cryptographically signing, by the portable computing device, the decoded first portion using the stored second portion of the authentication or authorization code, providing the authentication or authorization code, which is used as cryptographic key for granting access to said specific service or specific operation to the user,
    wherein the first portion of the authentication or authorization code is encoded based at least on a shape and/or a size of the set of capacitive points in the passive card, and
    wherein the first portion of the authentication or authorization code is encoded further based on a time constant of the set of capacitive points.

11. The method of claim 10, wherein some of the capacitive points of the set of capacitive points include information about the user or metadata about a card distributor, the information or metadata being encoded with an encoding system different to the encoding system used to store the first portion of the authentication or authorization code.

12. The method of claim 10, wherein the set of capacitive points are arranged divided in sets, wherein each set is connected to a different user connection point.

\* \* \* \* \*